United States Patent
Lerner et al.

(10) Patent No.: US 7,136,209 B2
(45) Date of Patent: Nov. 14, 2006

(54) LIGHT MODULATORS

(75) Inventors: Scott Lerner, Corvallis, OR (US);
James W. Ring, Blodgett, OR (US);
Anurag Gupta, Corvallis, OR (US);
Franc Potekev, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

(21) Appl. No.: 10/969,649

(22) Filed: Oct. 20, 2004

(65) Prior Publication Data
US 2006/0082853 A1 Apr. 20, 2006

(51) Int. Cl.
*G02B 26/00* (2006.01)
(52) U.S. Cl. .................. 359/237; 359/241; 359/242
(58) Field of Classification Search ............. 359/237, 359/238, 241, 242, 290, 291, 267, 268; 356/326; 353/20, 31, 33
See application file for complete search history.

(56) References Cited

U.S. PATENT DOCUMENTS

| 5,379,135 | A | 1/1995 | Nakagaki et al. |
| 5,490,009 | A | 2/1996 | Venkateswar et al. ...... 359/191 |
| 5,978,142 | A * | 11/1999 | Blackham et al. .......... 359/618 |
| 6,276,801 | B1 | 8/2001 | Fielding ...................... 353/31 |
| 6,961,166 | B1 * | 11/2005 | Wooten et al. .............. 359/245 |
| 2003/0048393 | A1 | 3/2003 | Sayag ........................... 349/5 |
| 2003/0142274 | A1 | 7/2003 | Gibbon et al. |
| 2004/0047030 | A1 * | 3/2004 | MacAulay ................. 359/368 |

FOREIGN PATENT DOCUMENTS

| EP | 0 829 747 A | 3/1998 |
| EP | 1 018 842 A | 7/2000 |
| WO | WO 2004/051995 A | 6/2004 |

* cited by examiner

*Primary Examiner*—Timothy Thompson

(57) ABSTRACT

Apparatus and systems may include a pair of coupling lenses to send light to, and to receive light from, a pair of light modulators.

27 Claims, 4 Drawing Sheets

LIGHT MODULATORS

BACKGROUND INFORMATION

For some illumination systems, it has been determined that increasing the number of light modulators may provide a higher level of black light contrast. However, using a greater number of light modulators may also result in an inordinate increase in the number of lenses and other optical components used to transmit the light from the source to the desired destination.

DETAILED DESCRIPTION

For the purposes of this document, a "light modulator" may comprise any device that receives light and re-transmits various portions of the light received according to the influence of one or more applied electrical signals. Examples of light modulators include those that are similar to or identical to a digital light processing (DLP) Discovery 1100 0.7XGA digital micro mirror device (DMD), available from TyRex Services of Austin, Tex. Pixelated, variable absorption devices that have top and bottom reflectors defining an optical cavity therebetween (so as to utilize optical interference for selecting various intensities and wavelengths of light) may also be used. Such devices are further described in pending U.S. patent application Ser. No. 10/428,261, titled "Optical Interference Pixel Display With Charge Control", filed on Apr. 30, 2003, assigned to the assignee of the embodiments disclosed herein, the Hewlett-Packard Development Company, L.P. and incorporated herein by reference in its entirety.

To address the challenge of reducing the number of optical components used in implementing a multi-modulator design, some embodiments make use of lenses that serve double-duty: receiving and transmitting light in two directions at the same time, perhaps making use of a split-pupil mechanism. Thus, in some embodiments, light from a source may travel through a first coupling lens to a first light modulator, where the light is modulated and sent back through the first coupling lens in the opposite direction. The light may then be received at a second modulator via a second coupling lens. The second modulator, in turn, may operate to modulate the received light and send the light back through the second coupling lens, on to a projection lens. The projection lens may be used to project an image provided by an image source coupled to the modulators onto a screen, such as a movie screen placed on a wall, or a screen forming a portion of a rear-projection television set. In some embodiments, light may be received from the first coupling lens at a fold mirror for transmission to the second coupling lens along a non-linear path.

Figure 1A:
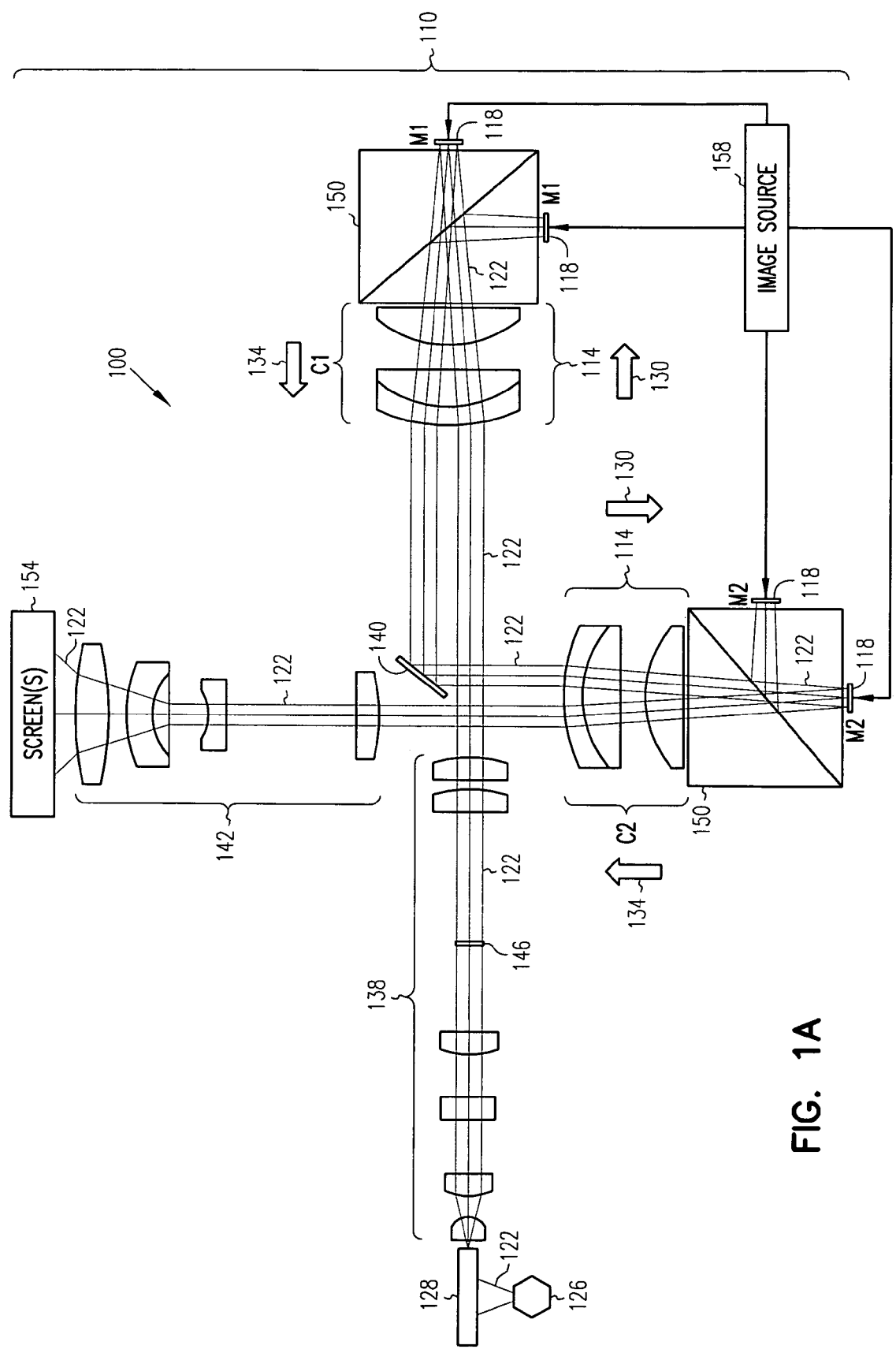
FIGS. 1A and 1B are block diagrams of apparatus and systems according to various example embodiments.
Figure 1B:
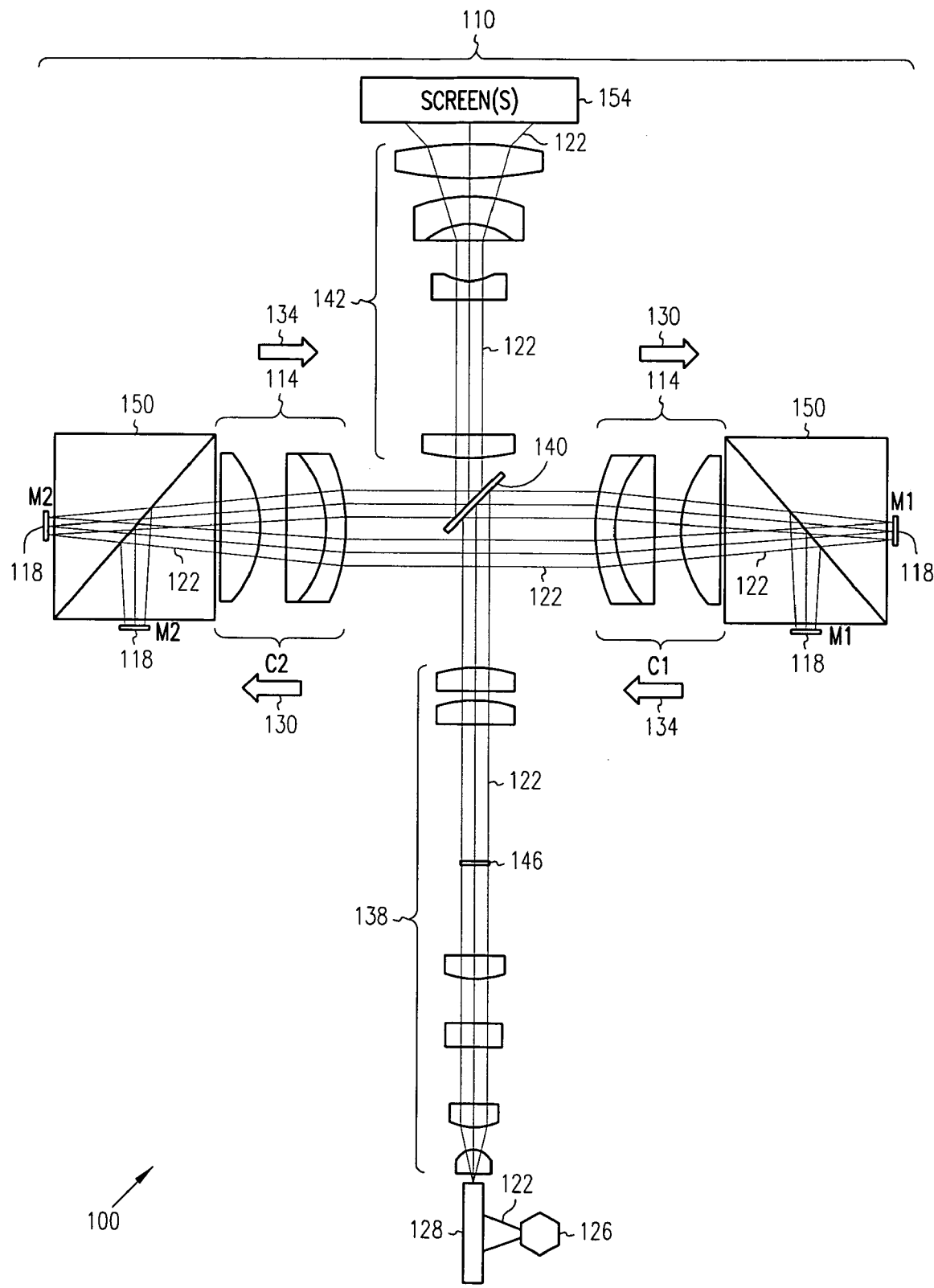

FIGS. 1A and 1B are block diagrams of apparatus 100 and systems 110 according to various example embodiments, each of which may operate in the manner described. For example, an apparatus 100 may comprise a pair of coupling lenses 114 (e.g., coupling lenses C1 and C2) and one or more pairs of light modulators 118 (e.g., two pairs of modulators M1, M2 are shown in FIGS. 1A and 1B). Some of the coupling lenses 114 may comprise a plurality of lens elements, such as an achromat and a telecentricity lens, including a convex lens. It should be noted that while "a pair of modulators M1, M2" are referenced as a matter of convenience in the following discussion, the phrase "the pairs of modulators M1, M2" may be substituted, if desired.

The light modulators 118 may be used to receive light 122 in series from a source 126 via the pair of coupling lenses 114. The source 126 may comprise any number of illumination elements, including an arc lamp, such as a mercury arc lamp. The source 126 may provide light 122 to an integrating bar 128, which may diffuse the light 122 prior to transmission to other elements of the apparatus 100. In some embodiments, each one of the pair of coupling lenses 114 may be used to receive the light in a first direction 130 and to transmit the light in a second direction 134, perhaps splitting the pupil of each one of the coupling lenses 114.

In some embodiments, the apparatus 100 may further include an illumination relay 138 to receive the light 122 from the source 126 and/or the integrating bar 128, and to transmit the light 122 to one modulator (e.g., M1) of a pair M1, M2 of light modulators 118. The illumination relay 138 may comprise any number of lens elements, including a first group of magnifying lenses, and a second group of collimating lenses. The apparatus 100 may also comprise a fold mirror 140 to receive the light 122 from one of the pair of light modulators 118, and to transmit the light to another one (e.g., M2) of a pair M1, M2 of light modulators 118. While the paths followed by the light 122 are shown in FIGS. 1A and 1B as being substantially perpendicular, it should be noted that other arrangements are possible (e.g., substantially parallel, and substantially non-parallel), and the embodiments disclosed are not to be so limited.

A projection lens 142 may be used to receive the light 122 from one modulator (e.g., M2) of a pair M1, M2 of light modulators 118. The projection lens 142 may comprise any number of separate lens elements or groups, such as a group of lenses derived from a Cooke triplet, and a focusing lens. The projection lens 142 may comprise alternating positive and negative lenses, providing several degrees of freedom for variable focus adjustment.

In some embodiments, the apparatus 100 may comprise a field stop 146, perhaps forming a portion of the illumination relay 138. The field stop 146 may be used to receive a magnified image (e.g., 4× magnification) of the source 126 at a point in the optical path where an intermediate image of the source 126 is present. The field stop 146 may be used to prevent over-filling of the modulators 118.

The apparatus 100 may also comprise one or more prisms 150 to receive the light 122 from one or more (e.g., C1) of the pair of coupling lenses 114 and to transmit the light 122 to one or more (e.g., M1) of a pair M1, M2 of light modulators 118. The prisms 150 may comprise dichroic or trichroic prisms, optically coupled to multiple modulators 118, perhaps using one modulator 118 at each prism 150 for each color to be processed in the light path. Other embodiments may be realized.

For example, an apparatus 100 may comprise a first coupling lens C1 to receive light 122 from a source 126, one or more first light modulators M1 to receive the light 122 from the first coupling lens C1, and a second coupling lens C2 to receive the light 122 from the first coupling lens C1. The apparatus 100 may comprise one or more second light modulators M2 to receive the light 122 from the second coupling lens C2, and a projection lens 142 to receive the light 122 from the second coupling lens C2.

In some embodiments of the apparatus 100, the light 122 may be received by the first coupling lens C1 and/or the second coupling lens C2 in two different directions 130, 134. As noted previously, the apparatus 100 may comprise a fold mirror 140 to receive the light 122 from the first light modulator(s) M1 and to transmit the light 122 to the second light modulator(s) M2 (see FIG. 1A). In some embodiments, the apparatus 100 may comprise a fold mirror 140 to receive the light 122 from the illumination relay 138, and to transmit the light 122 to the first and second light modulators M1, M2 (see FIG. 1B). Other embodiments may be realized.

For example, a system 110 may comprise one or more apparatus, similar to or identical to the apparatus 100 described previously. The system 110 may also comprise one or more screens 154 to receive the light 122 from one or more (e.g., M1 or M2) of a pair M1, M2 of light modulators 118. The system 110 may comprise means (e.g., one or more lens elements included in the projection lens 142) to receive the light 122 from one or more (e.g., M1 or M2) of a pair M1, M2 of light modulators 118 and to transmit the light 122 to the screen(s) 154.

In some embodiments, the system 110 may comprise means (e.g., an integrating bar 128, and/or one or more lens elements forming a portion of the illumination relay 138, and/or a field stop 146) to receive the light 122 from the source 126 and to transmit the light 122 to one or more of the pair of light modulators 118.

The system 110 may also comprise an image signal source 158 to couple to the pair of light modulators 118. The image signal source 158 may comprise any electronic signal source capable of transmitting information associated with an image so as to influence the light transmission state of one or more of the modulators 118. Thus, the image signal source 158 may comprise one or more of a digital video disk (DVD) player, a wireless television tuner (e.g., receiving local or satellite signals), a cable television tuner (e.g., making use of electrical or optical signal reception), and a wireless computing device (e.g., a laptop computer, a personal digital assistant (PDA), and a tablet computer), among others. Thus, the image signal source 158 may comprise circuitry to convert image data or signals into electrical signals capable of changing the light transmission state of the modulators 118, as is known to those of skill in the art.

The apparatus 100; system 110; coupling lenses 114, C1, C2; light modulators 118; pairs of light modulators M1, M2; light 122; source 126; integrating bar 128; illumination relay 138; fold mirror 140; projection lens 142; field stop 146; prisms 150; screens 154; and image signal source 158 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100 and the system 110, and as appropriate for particular implementations of various embodiments. The coupling lenses 114, illumination relay 138, and projection lens 142 may comprise a single lens, a plurality of lenses coupled together into a unitary lens, or several physically-separate lenses (e.g., as shown in FIGS. 1A and 1B).

It should also be understood that the apparatus and systems of various embodiments can be used in applications other than rear-projection televisions and video projectors, and thus, the various embodiments described herein are not to be so limited. The illustrations of an apparatus 100 and system 110 are intended to provide a general understanding of the structure of various embodiments, and they are not intended to serve as a complete description of all the elements and features of apparatus and systems that might make use of the structures described herein. Thus, the apparatus 100 and systems 110 of various embodiments may further be included as sub-components within a variety of products, such as televisions, cellular telephones, personal computers, PDAs, workstations, radios, video players, automobiles, airplanes, personal video projection systems, among others.

Figure 2:
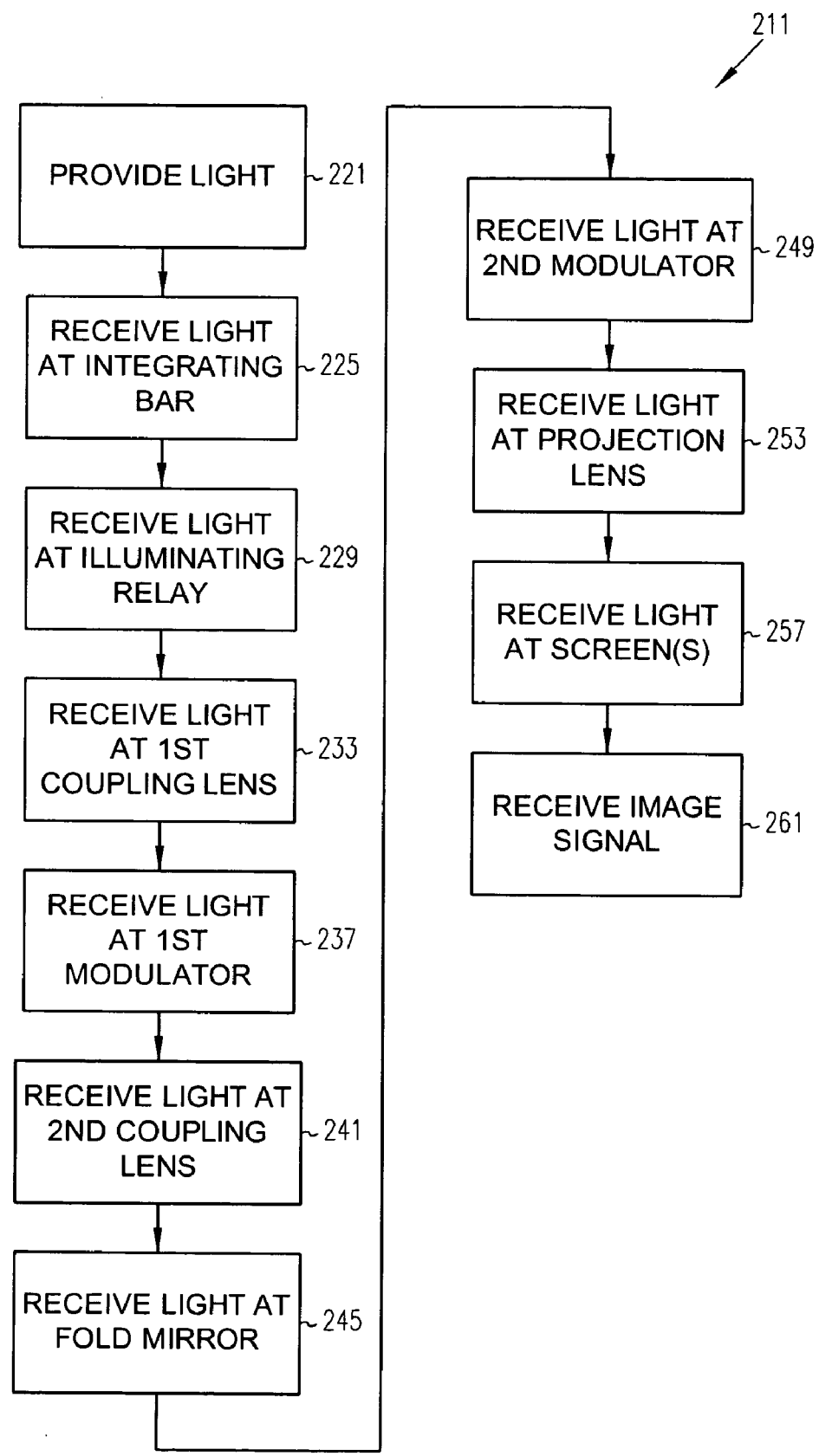
FIG. 2 includes a flow diagram illustrating several methods according to various example embodiments.

FIG. 2 includes a flow diagram illustrating several methods 211 according to various example embodiments. In some embodiments, a method 211 may (optionally) begin with providing a source of light at block 221. The method 211 may comprise receiving the light from the source at an integrating bar at block 225, perhaps including receiving the light at the integrating bar prior to receiving the light at an illumination relay. Thus, the method 211 may comprise receiving the light from the integrating bar at an illumination relay at block 229.

In some embodiments, the method 211 may comprise receiving light from a source at a first coupling lens at block 233, including receiving the light at the first coupling lens from the illumination relay. Thus, the method 211 at block 229 may comprise receiving the light at an illumination relay prior to receiving (and sending—see below) the light through the first coupling lens at block 233. The method 211 may also comprise receiving the light at the first coupling lens from a source via an illumination relay at block 233.

In some embodiments, the method 211 may comprise receiving the light from the first coupling lens at a first light modulator at block 237. Thus, in some embodiments, the method 211 may comprise receiving and sending light through a first coupling lens via a first light modulator, perhaps by splitting the pupil of the first coupling lens.

The method 211 may also comprise receiving the light from the first light modulator at a second coupling lens at block 241, perhaps by receiving the light at a fold mirror from the first light modulator at block 245, and then transmitting the light from the fold mirror to the second coupling lens. Thus, the method 211 may comprise receiving the light at a fold mirror prior to receiving (and sending) the light through the second coupling lens at block 245.

In some embodiments, the method 211 may comprise receiving the light from the second coupling lens at a second light modulator at block 249, perhaps by transmitting the light from a fold mirror to the second light modulator. The method 211 may therefore comprise receiving and sending the light through a second coupling lens via a second light modulator, perhaps by splitting the pupil of the second coupling lens. In addition, since multiple pairs of modulators may be used in some embodiments, the method 211 may comprise receiving and sending the light through the first coupling lens via a third light modulator, and subsequently receiving and sending the light through the second coupling lens via a fourth light modulator. Also, as noted above, the method 211 may comprise receiving light from the illumination relay, and transmitting the light to the first and second light modulators (e.g., as shown in FIG. 1B, and blocks 229, 245, 237, and 249 of FIG. 2).

Thus, the light path may be folded in a number of ways, including, for example, such that a first light path taken by the light to the first coupling lens is substantially perpendicular to a second light path taken by the light to the second coupling lens (shown in FIG. 1A). In addition, the light path may be folded such that a first light path taken by the light to the first coupling lens is not substantially parallel to a second light path taken by the light to the second coupling lens (also shown in FIG. 1A), depending on the placement of the fold mirror, and whether additional or alternative mirrors are placed in the light path. For example, it can be seen in FIG. 1B that a first light path taken by the light to the first coupling lens may also be substantially parallel to a second light path taken by the light to the second coupling lens.

As shown in FIG. 2, the method 211 may comprise receiving the light from the second coupling lens at a projection lens at block 253. Thus, the method 211 may comprise receiving the light at a projection lens subsequent to receiving and sending the light through the second coupling lens at block 253. The method 211 may comprise receiving the light from the projection lens at one or more screens at block 257. Thus, the method 211 may comprise receiving the light from the second light modulator at a screen via the projection lens at block 257. As noted previously, the screen may comprise a rear projection television screen, among others.

In some embodiments, the method 211 may (optionally) conclude with receiving an image signal from an image signal source at one or more of the light modulators at block 261. As noted previously, the image signal source may comprise one or more of a digital video disk player, a wireless television tuner, a cable television tuner, and a wireless computing device, among others.

It should be noted that the methods described herein do not have to be executed in the order described, or in any particular order. The words "subsequent," "prior," and similar terms are used to make it clear that a particular activity may come after, or precede, another, respectively. Moreover, various activities described with respect to the methods identified herein can be executed simultaneously, and/or in serial or parallel fashion. For the purposes of this document, the terms "information" and "data" may be used interchangeably. Information, including parameters, commands, operands, instructions, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including semaphores and remote procedure calls. The teachings of various embodiments are not limited to any particular programming language or environment. Thus, other embodiments may be realized, as shown in FIG. 3.

Figure 3:
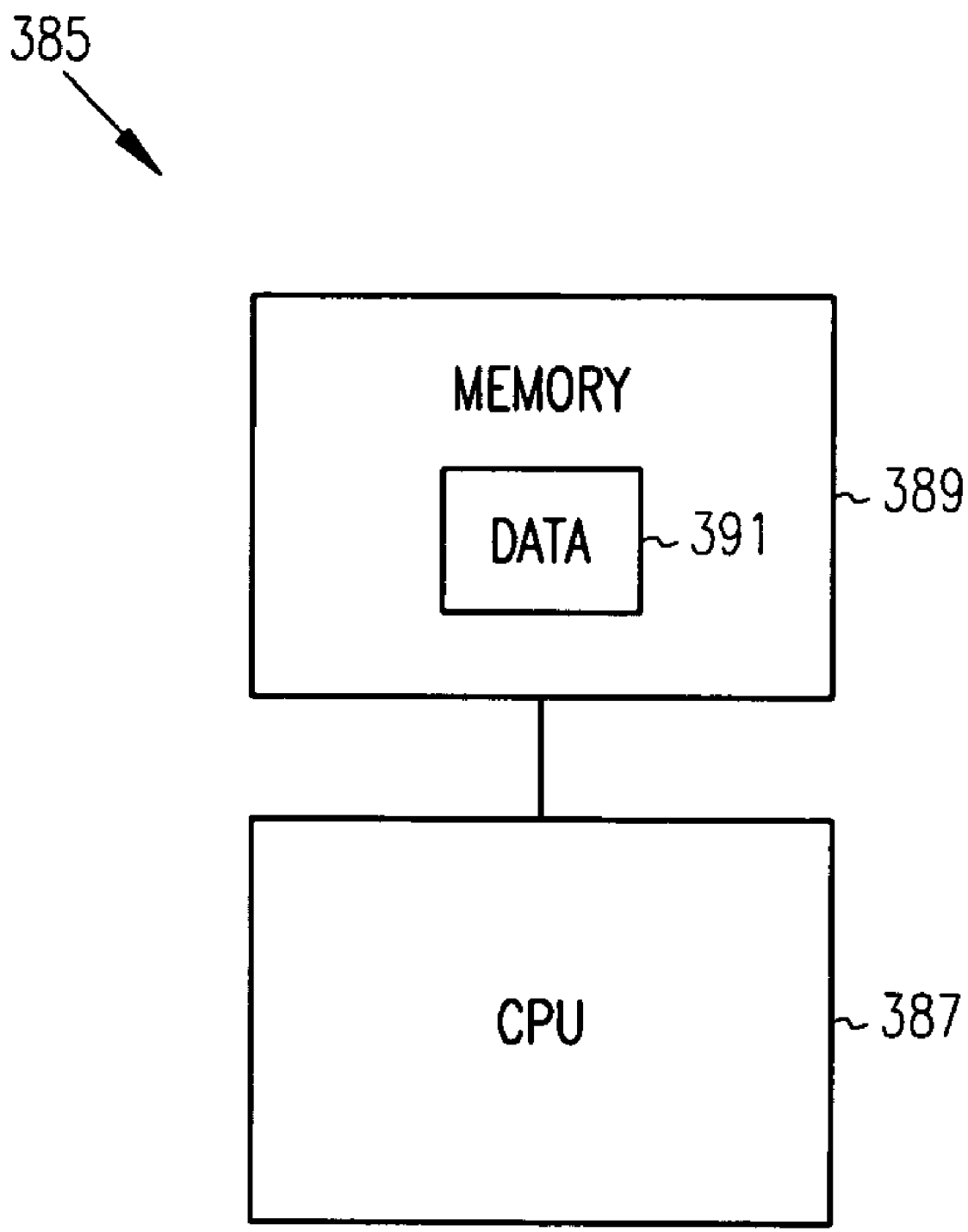
FIG. 3 is a block diagram of an article according to various example embodiments.

FIG. 3 is a block diagram of an article 385 according to various example embodiments, such as a computer, a memory system, a magnetic or optical disk, some other storage device, and/or any type of electronic device or system. The article 385 may comprise a processor 387 coupled to a machine-accessible medium such as a memory 389 (e.g., a memory including an electrical, optical, or electromagnetic conductor) having associated information 391 (e.g., computer program instructions, and/or other data), which when accessed, results in a machine (e.g., the processor 387) performing such actions as receiving and sending light through a first coupling lens via a first light modulator, and subsequently receiving and sending the light through a second coupling lens via a second light modulator. Other activities may include receiving the light at the first coupling lens from a source via an illumination relay, receiving an image signal from an image signal source at the first and/or second light modulators, and receiving the light from the second light modulator at a screen via a projection lens.

Implementing the apparatus, systems, and methods described herein may result in reducing the number of optical devices, such as lenses, that are used to transmit light between multiple modulators used in series. Such implementations may enable the manufacture of various consumer goods, such as televisions and projectors, at a reduced cost.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments of the invention have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
receiving light in a first direction in a first light path and sending an image back opposite the first direction in a first light path through a first coupling lens, located in the first light path, via a first light modulator, and subsequently receiving the image in a second direction in a second light path and sending a modified image back opposite the second direction in the second light path through a second coupling lens, located in the second light path, via a second light modulator.

2. The method of claim 1, further comprising:
receiving the image at a fold mirror prior to subsequently receiving the image and sending the modified image through the second coupling lens.

3. The method of claim 1, further comprising:
receiving the light at an illumination relay prior to receiving the light and sending the image through the first coupling lens.

4. The method of claim 3, further comprising:
receiving the light at an integrating bar prior to receiving the light at the illumination relay.

5. The method of claim 1, further comprising:
receiving the modified image at a projection lens subsequent to subsequently receiving the image and sending the modified image through the second coupling lens.

6. The method of claim 5, further comprising:
receiving the modified image from the projection lens at a screen.

7. The method of claim 1, further comprising:
receiving the light and sending the image through the first coupling lens via a third light modulator; and
subsequently receiving the image and sending the modified image through the second coupling lens via a fourth light modulator.

8. A method, comprising:
receiving light from a source at a first coupling lens;
receiving the light in a first direction from the first coupling lens at a first light modulator to create an image;
sending the image back opposite the first direction through the first coupling lens:
receiving the image from the first light modulator at a second coupling lens;
receiving the image in a second direction from the second coupling lens at a second light modulator to create a modified image;
sending the modified image back opposite the second direction through the second coupling lens; and
receiving the modified image from the second coupling lens at a projection lens.

9. The method of claim 8, further comprising:
receiving the light from the source at an integrating bar; and
receiving the light from the integrating bar at an illumination relay.

10. The method of claim 9, further comprising:
receiving the light at the first coupling lens from the illumination relay.

11. The method of claim 8, further comprising:
receiving the image at a fold mirror from the first light modulator; and
transmitting the image from the fold mirror to the second light modulator.

12. The method of claim 8, wherein a first light path taken by the light to the first coupling lens is not substantially parallel to a second light path taken by the image to the second coupling lens.

13. The method of claim 8, wherein a first light path taken by the light to the first coupling lens is substantially parallel to a second light path taken by the image to the second coupling lens.

14. An apparatus, comprising:
a first set of coupling lenses and a second set of coupling lenses; and
first and a second pair of light modulators, the first pair to receive light from a source in series via the first set of coupling lenses to create an image, the second pair to receive the image from the first set of coupling lens in series via the second set of coupling lenses to create a modified image wherein each one of the pair of coupling lenses is to receive the light in a first direction and to transmit the light in a second direction.

15. The apparatus of claim 14, further comprising:
an illumination relay to receive the light from the source and to transmit the light to one of the first pair of light modulators.

16. The apparatus of claim 14, wherein the illumination relay includes a field stop.

17. The apparatus of claim 14, further comprising:
a fold mirror to receive the light from the first pair of light modulators, and to transmit the light to second pair of light modulators.

18. The apparatus of claim 14, further comprising:
a projection lens to receive the modified image from second pair of light modulators.

19. The apparatus of claim 14, further comprising:
a prism to receive the light from the first set of coupling lenses and to transmit the light to the first pair of light modulators.

20. A system, comprising:
a first and second set of coupling lenses;
a first pair of light modulators to receive light from a source via the first set of coupling lenses and to transmit an image to the second set of coupling lenses to a second pair of light modulators thereby creating a modified image, wherein each one of the first and second set of coupling lenses is to receive the light in a first direction and to transmit the light in a second direction; and
a screen to receive the modified image from the second pair of light modulators.

21. The system of claim 20, further comprising:
is means to receive the modified image from the second pair of light modulators and to transmit the modified image to the screen.

22. The system of claim 20, further comprising:
means to receive the light from the source and to transmit the light to the first pair of light modulators.

23. The system of claim 20, further comprising:
an image signal source to couple to the first and second pair of light modulators.

24. An apparatus, comprising:
a first coupling lens to receive light from a source;
a first light modulator to receive the light from the first coupling lens to create an image directed back to the first coupling lens;
a second coupling lens to receive the image from the first coupling lens;
a second light modulator to receive the image from the second coupling lens to create a modified image directed back to the second coupling lens; and
a projection lens to receive the modified image from the second coupling lens.

25. The apparatus of claim 24, further comprising:
a fold mirror to receive light from the source and transmit the light to the first light modulator and to also receive the modified image from the second light modulator and transmit the modified image to the projection lens.

26. The apparatus of claim 24, further comprising:
a fold mirror to receive the image from the first light modulator and to transmit the image to the second light modulator.

27. The apparatus of claim 24, further comprising:
a third light modulator to receive the light from the first coupling lens; and
a fourth light modulator to receive the image from the second coupling lens.

* * * * *

UNITED STATES PATENT AND TRADEMARK OFFICE
CERTIFICATE OF CORRECTION

| | | |
|---|---|---|
| PATENT NO. | : 7,136,209 B2 | Page 1 of 1 |
| APPLICATION NO. | : 10/969649 | |
| DATED | : November 14, 2006 | |
| INVENTOR(S) | : Lerner et al. | |

It is certified that error appears in the above-identified patent and that said Letters Patent is hereby corrected as shown below:

Col. 8 (line 31), delete "is".

Signed and Sealed this

Eighteenth Day of September, 2007

JON W. DUDAS
*Director of the United States Patent and Trademark Office*